US006252206B1

(12) United States Patent
Leukhardt, III et al.

(10) Patent No.: US 6,252,206 B1
(45) Date of Patent: Jun. 26, 2001

(54) METHOD AND APPARATUS FOR INTELLIGENT COOKING PROCESS

(75) Inventors: H. Alan Leukhardt, III, La Verne; Dindo S. Uy, North Hollywood; Cyral Martin Walsh, Sherman Oaks, all of CA (US)

(73) Assignee: BSH Home Appliances Corporation, Huntington Beach, CA (US)

( * ) Notice: Subject to any disclaimer, the term of this patent is extended or adjusted under 35 U.S.C. 154(b) by 0 days.

(21) Appl. No.: 09/292,689

(22) Filed: Apr. 15, 1999

(51) Int. Cl.[7] .............................. H05B 3/02; H05B 6/64; A21B 1/00

(52) U.S. Cl. .......................... 219/486; 219/410; 219/680

(58) Field of Search .................................... 219/483, 486, 219/506, 410, 411, 412, 413, 680, 681, 685, 702, 710; 99/325

(56) References Cited

U.S. PATENT DOCUMENTS 4,568,810 * 2/1986 Carmean .............................. 219/720
5,345,067 * 9/1994 Ohta et al. ........................... 219/720
5,548,104 * 8/1996 Ko ....................................... 219/702
5,595,673 * 1/1997 Ekstrom et al. ..................... 219/710
5,756,970 5/1998 Barger et al. .
6,005,229 * 12/1999 Brown et al. ........................ 219/483

* cited by examiner

*Primary Examiner*—Sang Paik
(74) *Attorney, Agent, or Firm*—Brooks & Kushman P.C.

(57) ABSTRACT

A method and apparatus for controlling a cooking apparatus operates a plurality of cooking energy sources with a control including switches that reduce the input manipulations required by a user in order to operate one or more of the cooking energy sources to complete a cooking operation. The control responds to a first selection of a particular food type from a predetermined catalog of food category listings, responds to a second selection for setting a time duration corresponding to an instructional cooking period or recipe, and operates in response to the first and second selectors for generating operating parameters for at least one first cooking source for a predetermined time and for at least one second cooking source for a second predetermined time over a time period of less than and bearing a predetermined relationship to the instructional cooking period. The cooking temperature, the particular sources actuated, the duration during which each selected source operates and the power level at which the operations occur are selected automatically to perform in a predetermined process that completes a cooking process in response to the first and second selections.

20 Claims, 2 Drawing Sheets

METHOD AND APPARATUS FOR INTELLIGENT COOKING PROCESS

TECHNICAL FIELD

The present invention relates to methods and apparatus for controlling a cooking appliance that simplifies user input to perform cooking processes, including processes using a plurality of cooking energy sources for faster and more efficient cooking.

BACKGROUND ART

Cooking appliances have been available, for example, Thermador lines of built-in wall ovens, that feature combination cooking. Combination cooking often involves the use of a microwave cooking source in addition to a thermal cooking source or thermal convection heat source. Using combination cooking can result in a significant decrease in cooking time while maintaining the same level of cooking performance with that of conventional cooking means. However, the previously known combination cooking ovens include controls that require multiple actuations to select and define the combination operating mode by individually programming the use of each source such as the element selection, time and temperature of thermal convection heating, the time, element selection and temperature of thermal cooking and the time and power level of microwave cooking separately. For example, a user may select to bake at 350° and at the same time, microwave at 50% power level for 30 minutes. In this instance, the user has to select the mode (bake) and temperature (350°), select the additional mode (microwave) and power level (50%) and the length of time to cook (30 minutes). As shown by the example, selecting the combination mode with previously known controls can be an involved process, requiring numerous pieces of information from the user and numerous switch manipulations by the user to generate the information for setting up control of the cooking apparatus.

DISCLOSURE OF INVENTION

The present invention overcomes the above mentioned disadvantages by reducing complexity of control, simplifying programming with a user friendly, automated combination of cooking processes. In a preferred example referred to as the CookSmart™ mode, the programming of the combination mode described above is simplified by reducing user chosen selections to two steps and requiring a substantially lower amount of information than previous processes. In this example, the user simply selects the type of food to be cooked according to one of a plurality of predefined categories, and enters the length of conventional cooking time.

In the preferred embodiment, the cooking control includes four predefined categories. For example, in a CookSmart process mode, the user may select CookSmart 1 mode for a cooking process for foods that include breads and desserts, CookSmart 2 mode for a cooking process for foods that include vegetables, CookSmart 3 mode for a cooking process for foods that include meats and casseroles, and CookSmart 4 mode for a cooking process for foods that include frozen foods.

The length of instructional cooking time, preferably the conventional bake time taught by a recipe, is entered by the user and is automatically converted by the control to an actual reduced cooking time. The actual reduced cooking time may be a fraction of the conventional cooking time, the reduction factor of which depends on the category selected. Each automated cooking process category specifies to the control the type of heat mode or combination of cooking energy sources to use, the temperature to which the oven is to be raised, the type of each cooking energy source, the microwave power level to use and the cooking time conversion factor. For example, in the above CookSmart cooking process modes, a user's input of the food category and time may be converted to time, power and the temperature commands as follows.

In CookSmart 1 cooking process mode, the control governs the appliance to convection bake at 400°, microwave at 40%, time factor of 25%.

In CookSmart 2 cooking process mode, the control governs the appliance to bake at 450°, microwave at 80%, time factor of 30%.

In CookSmart 3 cooking process mode, the control governs the appliance to convection bake at 400°, microwave at 70%, time factor of 25%.

In CookSmart 4 cooking process mode, the control governs the appliance to convection bake at 425°, microwave at 50%, time factor of 40%.

As a further example, cookies that are normally baked in a standard oven at 375° for 10 minutes may be prepared with the parameters above by selecting CookSmart 1, and entering the conventional cook time, which in this case is 10 minutes. Once activated, the control calculates for the reduced cooking time by multiplying the entered conventional cook time by the time factor identified above in the CookSmart 1 cooking process mode, which calculates a cooking time of 2½ minutes. The appliance will then automatically convection bake at 400° and microwave at 40% for 2½ minutes. The control will turn off the cooking energy sources at the end of 2½ minutes.

The examples above are for illustration purposes only. The number and definitions of food categories, and the number and operation of each heating source for each category, and the number and types of categories may be defined in numerous specifications and standards within the controller without departing from the present invention.

BRIEF DESCRIPTION OF DRAWINGS

The present invention will be more fully understood by reference to the following detailed description of a preferred embodiment of the present invention when read in conjunction with the accompanying drawing in which like reference characters refer to like parts throughout the views, and in which.

BEST MODE FOR CARRYING OUT THE INVENTION

Figure 1:
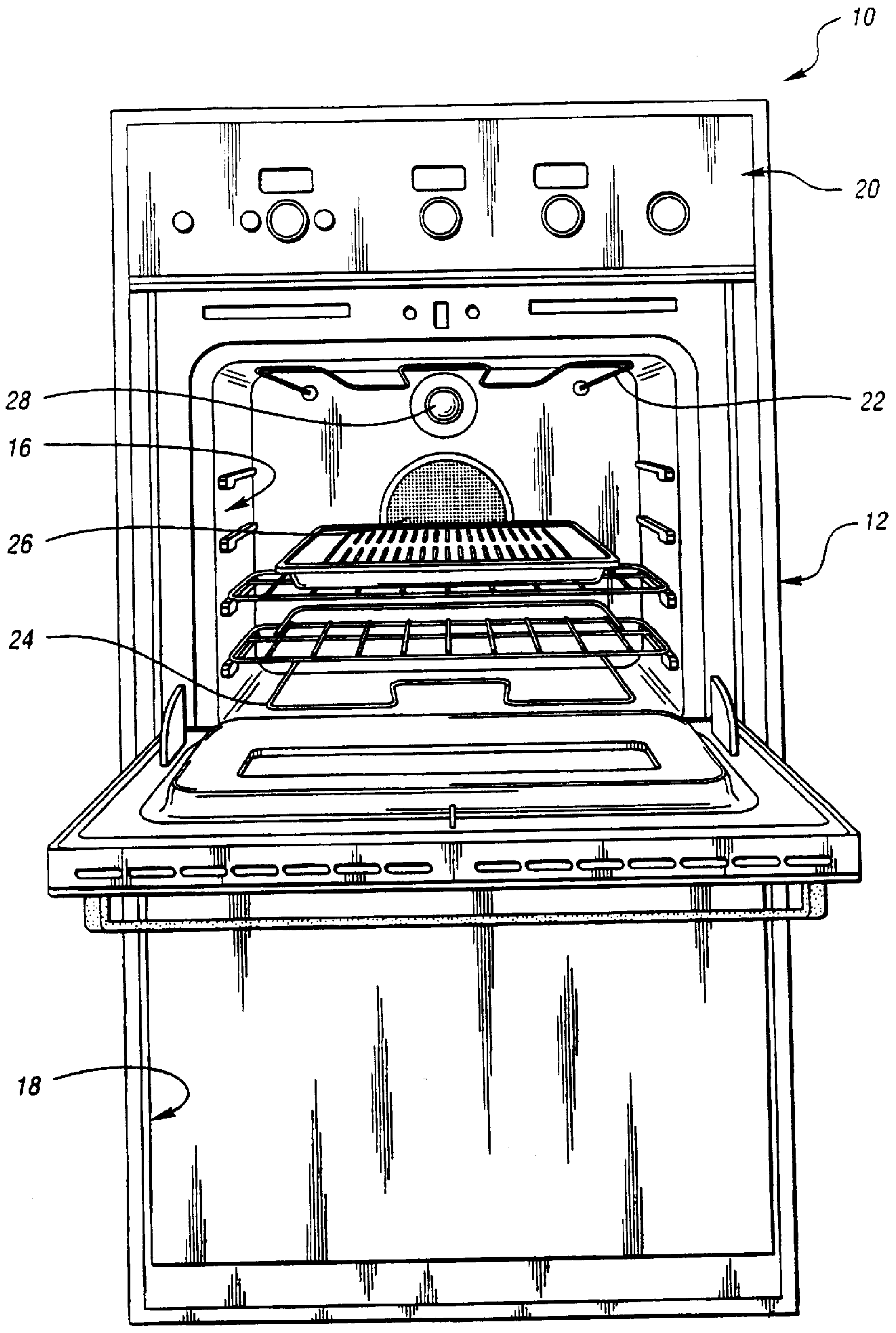
FIG. 1 is a front view of a cooking appliance with a plurality of cooking energy sources controlled in accordance with the method and apparatus of the present invention.

Referring first to FIG. 1, a cooking appliance 10 is shown including an oven 12 with a plurality of cooking energy sources in communication with the cooking chamber 16. In addition, an oven chamber 18 also containing elements for the same or different cooking energy sources can also be provided in the additional oven 18 as shown in phantom line in FIG. 1. Regardless of the number of oven chambers, the cooking appliance 10 includes a control panel 20 and enables the user to provide input, preferably to a microprocessor-based control system 21 to be described in greater detail below, that automatically operates one or more cooking energy sources in a predetermined, controlled manner to perform a complete cooking process.

Moreover, while the control panel 20 is incorporated as a structural portion of the appliance in the preferred embodiment, it is to be understood the control and the switches actuated by the user may be physically external to the appliance, for example, a universal control for all appliances in a room or building, and may also incorporate remote control technology that does not require a user's presence immediately in front of the appliance.

In the preferred embodiment, the plurality of cooking energy sources includes a baking cooking source, such as the source including heating elements such as the upper broiler heating element 22 and the lower baking element 24. The baking and broiling features may be further enhanced where a convection fan is employed during operation of one or more of the heating elements. Nevertheless, the preferred embodiment includes a convection thermal cooking source 26 that has a heating element associated with the fan and operated independently of the baking elements 22 and 24. The cooking chamber 16 also includes a microwave generator 28 to provide an additional cooking energy source within the chamber 16 that may be used independently or cooperatively with the other heating elements. The present invention may also be employed with cooking appliances having other cooking energy sources such as jet impingement heaters, without departing from the scope and spirit of the present invention.

Figure 2:
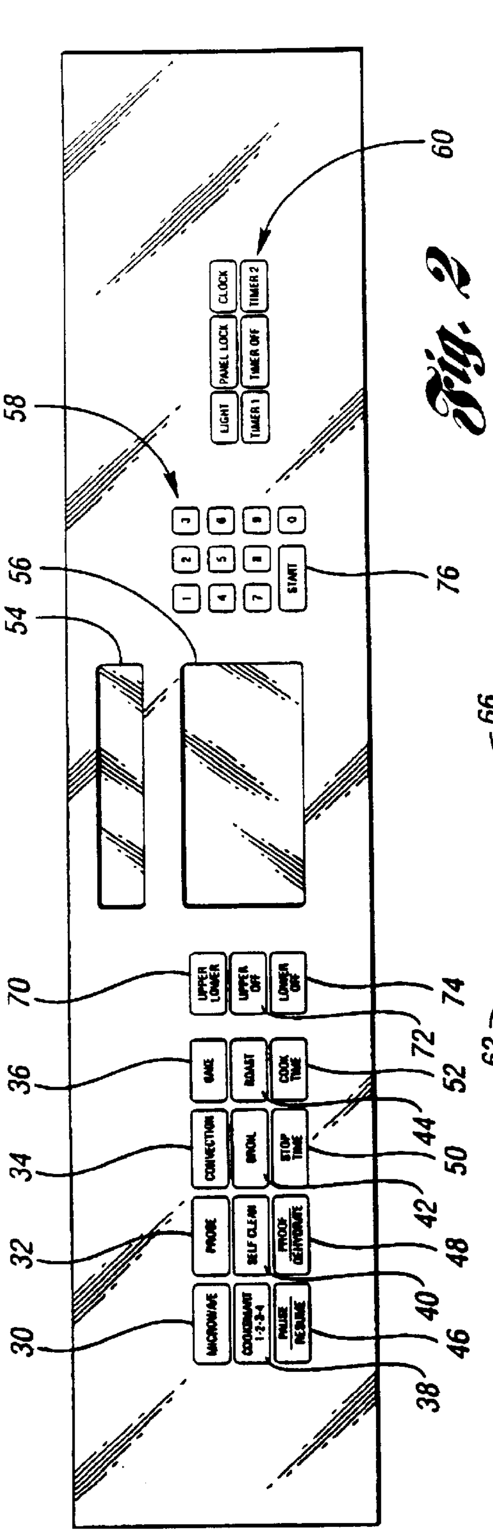
FIG. 2 is an enlarged front view of the control panel showing the cooking appliance in FIG. 1.

Referring now to FIG. 2, control panel 20 includes tactile switches, preferably in the form of touch sensing switches covered by a face panel to limit exposure of the active switch components and to avoid protruding switch parts through the panel. Each touch pad switch is marked by indicia as shown at reference characters 30–52. In addition, a keypad 58 and a keypad 60 each with a plurality of switches complete the user interface of the control. In view of the numerous controls, cooking sources and operating functions in the cooking appliance 10, it will be understood that a complex procedure of input switch actuations may be required to perform complex functions, such as combining cooking processes, without a processor control to simplify the inputs required by the user as provided by the present invention.

Figure 3:
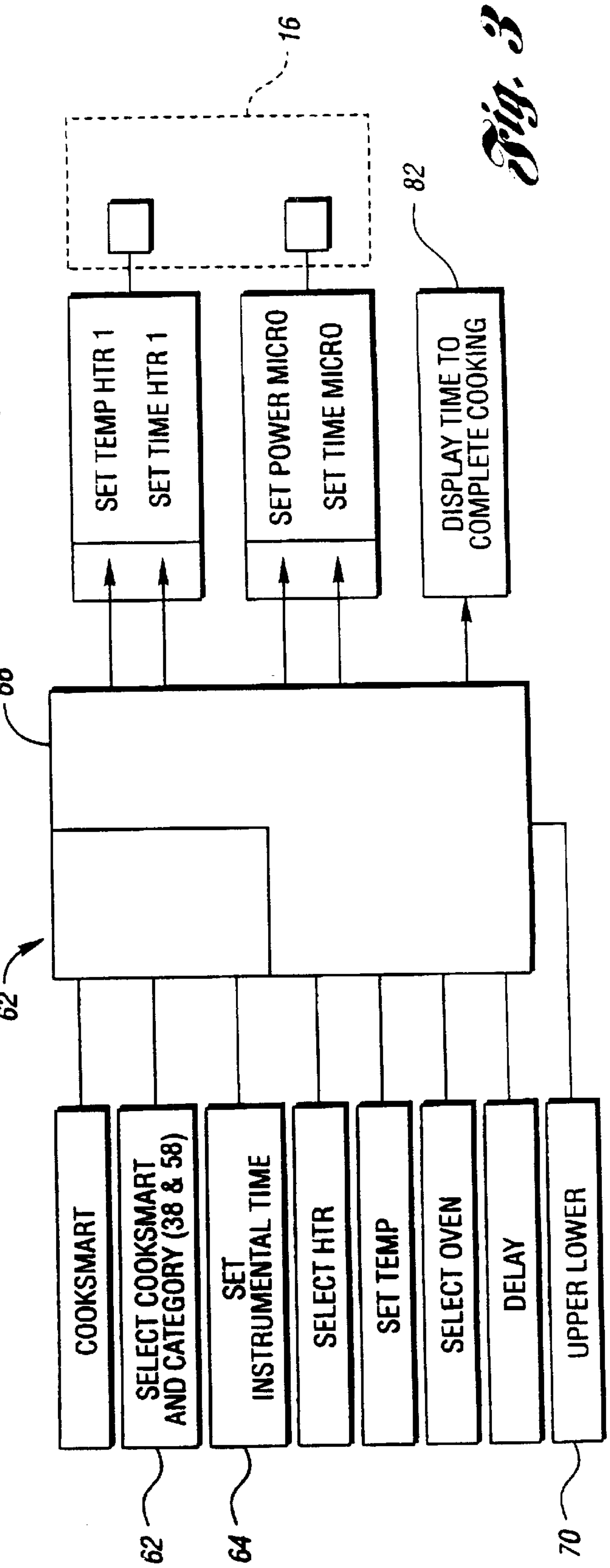
FIG. 3 is a diagrammatic view of the inputs and outputs to the cooking appliance control constructed in accordance with the present invention.

Referring now to FIG. 3, the CookSmart automated cooking process control 62 automatically sets operating parameters for and actuates at least one, and preferably a combination of cooking energy sources, including the temperature or power rating of the source, and the time period for each action of the combination of sources, temperatures, and power levels, in response to a limited input of information from the user. In the preferred embodiment, selection of the CookSmart automated cooking process is initiated by selection of the CookSmart category and setting of the time corresponding to an instructional time period. Preferably, the instructional time period is the stated recommended cooking time for conventional lower element baking of a particular recipe of the food item to be cooked, although it is to be understood that the instructional time may also be adjusted for degrees of doneness or browning that may be desired by a user, or may be subject to changes depending on the types of cooking energy sources conventionally recommended or applied to the food item to be prepared.

Preferably, when setting a CookSmart process mode, the appliance control will preheat the operative thermal elements. After selecting the CookSmart food category by number, in the preferred embodiment by pressing switch 38 (FIG. 2) and a number switch on keypad 58, the conventional cook time called for in a recipe is entered by pressing switch 52 and the number of minutes or hours and minutes on keypad 58. A reduced cooking time is generated by the control 62 automatically by the CookSmart automated process algorithm in the microprocessor 66. For example, CookSmart modes cook in about ¼ conventional cooking time when the microprocessor is programmed to combine convection heating with microwave heating in each CookSmart mode (i.e., 12 minutes conventional time equals 3–4 minutes CookSmart time). The oven temperature is automatically determined by the CookSmart cooking process in control 62. Nevertheless, other cooking modes may be selected or combined, for example, CookSmart automated cooking may be applied with appliances using JetDirect convection and microwaves for fast browning and cooking.

After selecting UPPER oven by touching UPPER/LOWER 70, the control 66 generates a display 92 at Window 54 (FIG. 2) after selecting and pressing CookSmart Pad 38, the keypad 58 for food group 1, 2, 3, or 4. The instructional cooking time, preferably the conventional heating cooking time recommended in a recipe, is entered. The user presses START pad 76 to see time indicia at window 54 and to preheat the oven. When the oven reaches the correct temperature one chime will sound and the word "PREHEAT" at Window 56 disappears.

After the oven is preheated, the user places food in the oven 16 and selects START by depressing key 76. The conventional cook time originally entered is converted to actual cooking time, and the actual cook time is then displayed at window 54. A motorized door latch locks the door. Cook time countdown begins. The cooking process may be paused by pressing a switch on keypad 46, labeled PAU. Cook time stops counting down when the oven is paused, the door latch unlocks, and the time remaining is displayed in window 54. To resume the cooking process, the user closes the door and touches pad 46 again. The door latch locks the door, and cook time resumes counting down as displayed at the window 54. At the end of CookSmart cooking mode, the oven chimes, preferably, a plurality of times, and the word "End" is displayed at window 54. The door latch unlocks the door and the lock symbol displayed in window 56 extinguishes. To cancel a CookSmart mode after the mode has started, a user touches Upper Off pad 72 or Lower off pad 74 depending upon the oven selected. The door latch unlocks the door, and the timer display 54 reverts to a display of the time of day. To add more time to a CookSmart mode after the original cooking time has elapsed, the user selects the CookSmart mode and number as at 64 (FIG. 3), and sets an instructional cook time (the time automatically converts to CookSmart time).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

Having thus described the present invention, many modifications will become apparent to those skilled in the art to which it pertains without departing from the scope and spirit of the present invention as defined in the appended claims.

What is claimed is:

1. A control for a cooking apparatus having a plurality of cooking energy sources and a microprocessor responsive to a set of tactile switches, the control comprising;

a first selector for selecting a food type from a predetermined catalog of food category listings, a second selector for setting a time duration corresponding to an instructional cooking period for a recipe, an operator responsive to said first and second selectors for generating operating parameters for at least one first cooking energy source, for a first predetermined time, and for at least one second cooking energy source for a second predetermined time in a predetermined relationship over a time period less than and bearing a predetermined relationship to said instructional cooking period.

2. The invention is defined in claim 1 wherein said first selector comprises a process selection switch and a numeric keypad.

3. The invention as defined in claim 1 wherein said cooking energy supply sources are taken from the group consisting of a convection heater, a microwave heater, a jet impingement heater and a baking element.

4. The invention as defined in claim 1 wherein said operator schedules said first predetermined time for a duration at least partly overlapping said second predetermined time period.

5. The invention as defined in claim 4 wherein said predetermined catalog of food category listings includes said first category for cooking desserts.

6. The invention as defined in claim 1 wherein said predetermined catalog of food category listings includes a first category for cooking breads.

7. The invention as defined in claim 1 wherein said predetermined catalog of food category listings includes a first category for cooking vegetables.

8. The invention as defined in claim 1 wherein said predetermined catalog of food category listings includes a first category for cooking meats.

9. The invention as defined in claim 1 wherein said predetermined catalog of food category listings includes a first category for cooking casseroles.

10. The invention as defined in claim 1 and further comprising a third selector actuating said first and second cooking energy sources according to said generated operating parameters.

11. The invention as defined in claim 1 and further comprising wherein said first cooking energy source is a convection thermal heat source and said second cooking energy is a microwave heater.

12. The invention as defined in claim 1 wherein said predetermined catalog of food category listings includes a first category for cooking frozen foods.

13. The invention as defined in claim 12 wherein said plurality of cooking energy sources includes at least one convection heater and at least one microwave heater.

14. The invention as defined in claim 12 wherein said abbreviated time period is predetermined in said control according to said selecting function as a predetermined percentage of said instructional cooking period.

15. The invention as defined in claim 1 wherein said operator generates an operating parameter for at least one of said first and second energy sources including setting a predetermined cooking temperature parameter.

16. A method for cooking by combining operation of a plurality of cooking energy sources automatically in a multiple source cooking appliance comprising:

selecting a food type from a predetermined category of food category listings, by actuating an input associated with said selected food type, and setting a cooking time according to an instructional cooking period by actuating a timer control for operation over a predetermined time duration corresponding to an instructional cooking period;

said selecting and setting steps generating operating parameters for a plurality of cooking energy sources in sequential or overlapping time periods automatically to complete the cooking process within an abbreviated time period bearing a predetermined relationship to said instructional cooking period.

17. The invention as defined in claim 1 and further comprising actuating said first cooking energy sources according to said generated operating parameters.

18. The invention as defined in claim 17 wherein said actuating function automatically operates said convection heater for at least one predetermined temperature for at least one first predetermined time.

19. The invention as defined in claim 17 wherein said actuating function automatically operates said microwave heater for at least one second predetermined time period at least one first predetermined power rating.

20. The invention as defined in claim 16 wherein said generating operating parameter comprises setting a predetermined cooking temperature parameter for at least one of said first and second energy sources.

* * * * *